United States Patent
Ricotti et al.

(10) Patent No.: US 6,721,127 B2
(45) Date of Patent: Apr. 13, 2004

(54) ELECTRONIC DEVICE FOR DRIVING AN ACTUATOR DEVICE FOR A HARD DISK AND FOR DRIVING A MOTOR THAT TURNS THE HARD DISK

(75) Inventors: Giulio Ricotti, Broni (IT); Giorgio Pedrazzini, Pavia (IT); Francesco Tampellini, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 375 days.

(21) Appl. No.: 09/823,912

(22) Filed: Mar. 30, 2001

(65) Prior Publication Data

US 2002/0001154 A1 Jan. 3, 2002

(30) Foreign Application Priority Data

Mar. 31, 2000 (EP) ............................................ 00830241

(51) Int. Cl.⁷ .............................................. G11B 5/596
(52) U.S. Cl. ..................................... 360/78.12; 360/75
(58) Field of Search ............................... 360/46, 78.05, 360/69, 78.12, 75; 318/560; 438/542, 546; 324/772; 257/394

(56) References Cited

U.S. PATENT DOCUMENTS

| 5,189,578 A | | 2/1993 | Mori et al. ................. 360/106 |
| 5,491,395 A | | 2/1996 | Hutsell et al. .............. 318/560 |
| 5,606,468 A | * | 2/1997 | Kodama ....................... 360/75 |
| 5,764,444 A | * | 6/1998 | Imamura et al. .......... 360/294.4 |
| 5,936,787 A | | 8/1999 | Ohmi ....................... 360/73.03 |
| 6,021,015 A | * | 2/2000 | Jeffrey et al. ................. 360/69 |
| 6,034,834 A | * | 3/2000 | Yoshikawa et al. ........... 360/75 |
| 6,160,676 A | * | 12/2000 | Takaishi .................. 360/78.05 |
| 6,490,118 B1 | * | 12/2002 | Ell et al. .................. 360/77.04 |

FOREIGN PATENT DOCUMENTS

| EP | 0605343 A1 | 7/1994 |
| EP | 0665548 A1 | 8/1995 |

OTHER PUBLICATIONS

Texas Instruments: TLS2205 Data Spec., Dec. 1993;.*
Texas Instruments: THS3122/ThS3125 Data Spec. Sep. 2001.*

* cited by examiner

Primary Examiner—Andrew L. Sniezek
Assistant Examiner—K. Wong
(74) Attorney, Agent, or Firm—Lisa K. Jorgenson; E. Russell Tarleton; Seed IP Law Group PLLC

(57) ABSTRACT

An electronic device for driving an actuator device for a hard disk and a motor for turning the hard disk, the device having a first driving circuit connected to the rotation motor and integrated in a chip of semiconductor material having a substrate defining a reference-potential region, a second driving circuit integrated in the chip and connected to a first actuation stage of the actuator device, and a third driving circuit integrated in the chip and connected to a second actuation stage of the actuator device. The actuator device supports a read/write transducer of the hard disk. The first actuation stage performs a rough displacement of the read/write transducer, while the second actuation stage performs a finer displacement of the same read/write transducer.

18 Claims, 4 Drawing Sheets

ELECTRONIC DEVICE FOR DRIVING AN ACTUATOR DEVICE FOR A HARD DISK AND FOR DRIVING A MOTOR THAT TURNS THE HARD DISK

TECHNICAL FIELD

The present invention pertains to hard disk drives, and, more importantly, to an electronic device for driving an actuator device for a hard disk and for driving a motor that turns the hard disk.

BACKGROUND OF THE INVENTION

As is known, rather complex electronic devices are used for driving hard disks, commonly referred to as "COMBOs", which comprise circuits dedicated to driving the motor that turns the hard disk and to driving the actuator device of the hard disk itself, A/D and D/A converters, digital circuits, power blocks, and so on.

In greater detail, FIG. 1 shows a hard disk 1, which is positioned inside a container 2 and is provided with a plurality of tracks for data storage. The hard disk 1 is connected by means of a hub 4 to a shaft 5, which is in turn connected to an electric motor 6 ("spindle"), which causes rotation of the hard disk 1 about the shaft 5 at a constant rate. The electric motor 6 is driven by an electronic device 7, connected to the motor itself by means of a first flexible cable 8.

In addition, the electronic device 7 drives, via a second flexible cable 9 and a third flexible cable 10, respectively a first actuation stage 11 and a second actuation stage 12 of an actuator device 13.

In detail, the first actuation stage 11 consists of an induction motor (also referred to as "voice coil motor") to which a suspension 15 formed by a lamina is fixed in cantilever fashion. The suspension 15 ends with a flexible portion 16 which carries, at its free end, a read/write transducer 17 ("slider") and a pair of actuators 18a and 18b made of piezoelectric material, one set on one side, and the other set on the other side, of the floating end of the flexible portion 16. The flexible portion 16 and the piezoelectric actuators 18a, 18b constitute the second actuation stage 12 of the actuator device 13. In particular, each piezoelectric actuator 18a, 18b consists of a chip of piezoelectric material set between two metal plates that form the two electrodes of the actuator; one electrode is connected to the flexible portion 16 (ground), whilst the other is floating.

Advantageously, the read/write transducer 17 is fixed to the flexible portion 16 by means of a gimbal 19. In addition, the read/write transducer 17 supports a read/write head 20 which constitutes the reading and writing device proper of the hard disk 1.

The first actuation stage 11 displaces the ensemble made up of the suspension 15 and of the read/write transducer 17 through the hard disk 1 during track search (rough displacement), whilst the second actuation stage 12 carries out fine control of the position of the read/write transducer 17, following the track (finer regulation).

In particular, the flexible portion 16 converts the mechanical deformation undergone by the piezoelectric actuators 18a, 18b as a result of a potential applied to their floating electrodes into a linear displacement of the read/write transducer 17. To a first approximation, apart from hysteresis phenomena due to a non-unique relation between the potential applied to the floating electrodes of the piezoelectric actuators 18a, 18b and the mechanical deformation undergone by the piezoelectric actuators themselves, we will find that for positive potentials applied to the floating electrodes there is obtained a displacement of the read/write transducer 17 in a first direction, whilst for negative potentials applied to the floating electrodes, the read/write transducer 17 is displaced in a second direction opposite to the first.

For this purpose, each piezoelectric actuator 18a, 18b is driven by means of an amplifier circuit which is included in the electronic device 7 and has both positive and negative output dynamics with respect to the ground of the actuator. Typically, amplifier circuits are used with output dynamics of dozens of volts (e.g., from ±12 V up to ±40 V).

In general, these amplifier circuits are integrated using junction-isolation techniques, exploiting reverse-biased junctions to obtain isolation of the various components making up the amplifier circuit itself. In order to prevent forward biasing of these junctions, the substrate of semiconductor material, in which the amplifier circuit is integrated, must necessarily be connected to the largest negative potential among those applied to the amplifier circuit itself (a potential which, as has been said previously, may even reach ±40 V).

At present, this requirement prevents these amplifier circuits from being integrated in one and the same chip of semiconductor material in which the other circuits making up the electronic device 7 are made. In fact, this chip, on account of the presence of power blocks, requires a substrate electrically connected to ground. Given that the two requirements mentioned above (substrate connected to the largest negative potential and substrate connected to ground) are mutually incompatible, it is not feasible to have an electronic device 7 that works properly and is integrated in one and the same chip of semiconductor material together with the amplifier circuits.

The technical problem that lies at the root of the present invention is to provide an electronic device that will overcome the limitations specified above with reference to the known art.

SUMMARY OF THE INVENTION

The disclosed embodiment of the invention is directed to an electronic device for driving an actuator device for a hard disk and a motor for turning the hard disk that includes a first driving circuit connected to the rotation motor and integrated in a chip of semiconductor material that has a substrate defining a reference-potential region; a second driving circuit integrated in the chip and connected to the first actuation stage; and a third driving circuit integrated in the chip and connected to the second actuation stage of the actuator device. Ideally, the third driving circuit has two amplifier circuits integrated in the chip, each connected to a respective piezoelectric actuator, each of the amplifier circuits driving a respective piezoelectric actuator to control displacements of a read/write transducer.

In accordance with another embodiment of the invention, a hard disk system is provided that includes an actuator device for a hard disk and a motor for turning the hard disk, the actuator device supporting a read/write transducer and including a first actuation stage and a second actuation stage that respectively control a first displacement and a second displacement of the read/write transducer, and the electronic device including a first driving circuit connected to the motor and integrated in a chip of semiconductor material that has a substrate defining a reference-potential region; a second driving circuit integrated in the chip and connected to the first actuation stage; and a third driving circuit integrated in the chip and connected to the second actuation stage of the actuator device.

BRIEF DESCRIPTION OF THE DRAWINGS

The characteristics and advantages of the electronic device according to the invention will emerge from the ensuing description of an example of embodiment, which is given merely to provide a non-limiting illustration, with reference to the attached drawings.

In the said drawings.

DETAILED DESCRIPTION OF THE INVENTION

Figure 1:
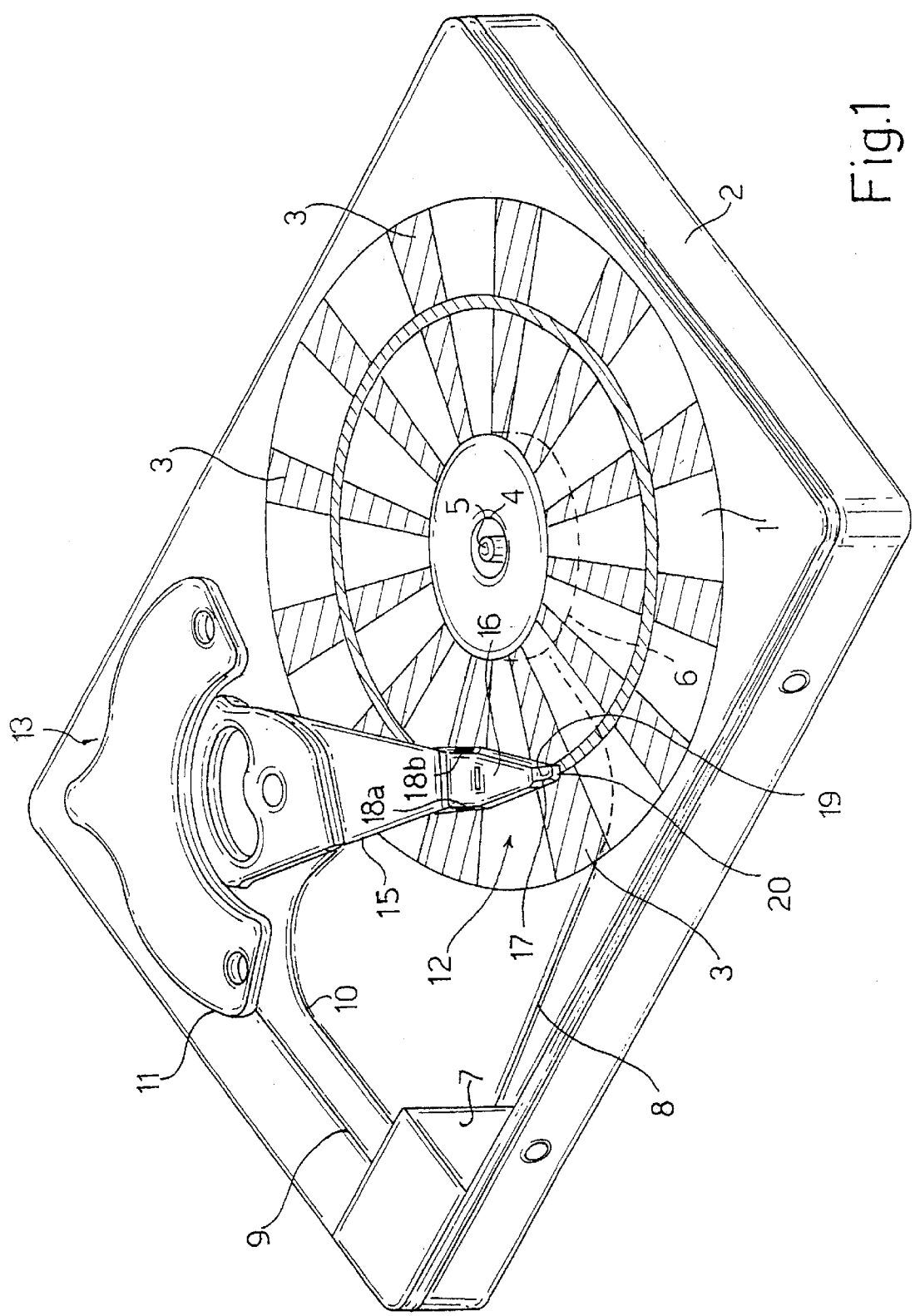
FIG. 1 is a perspective view of a hard disk.
Figure 2:
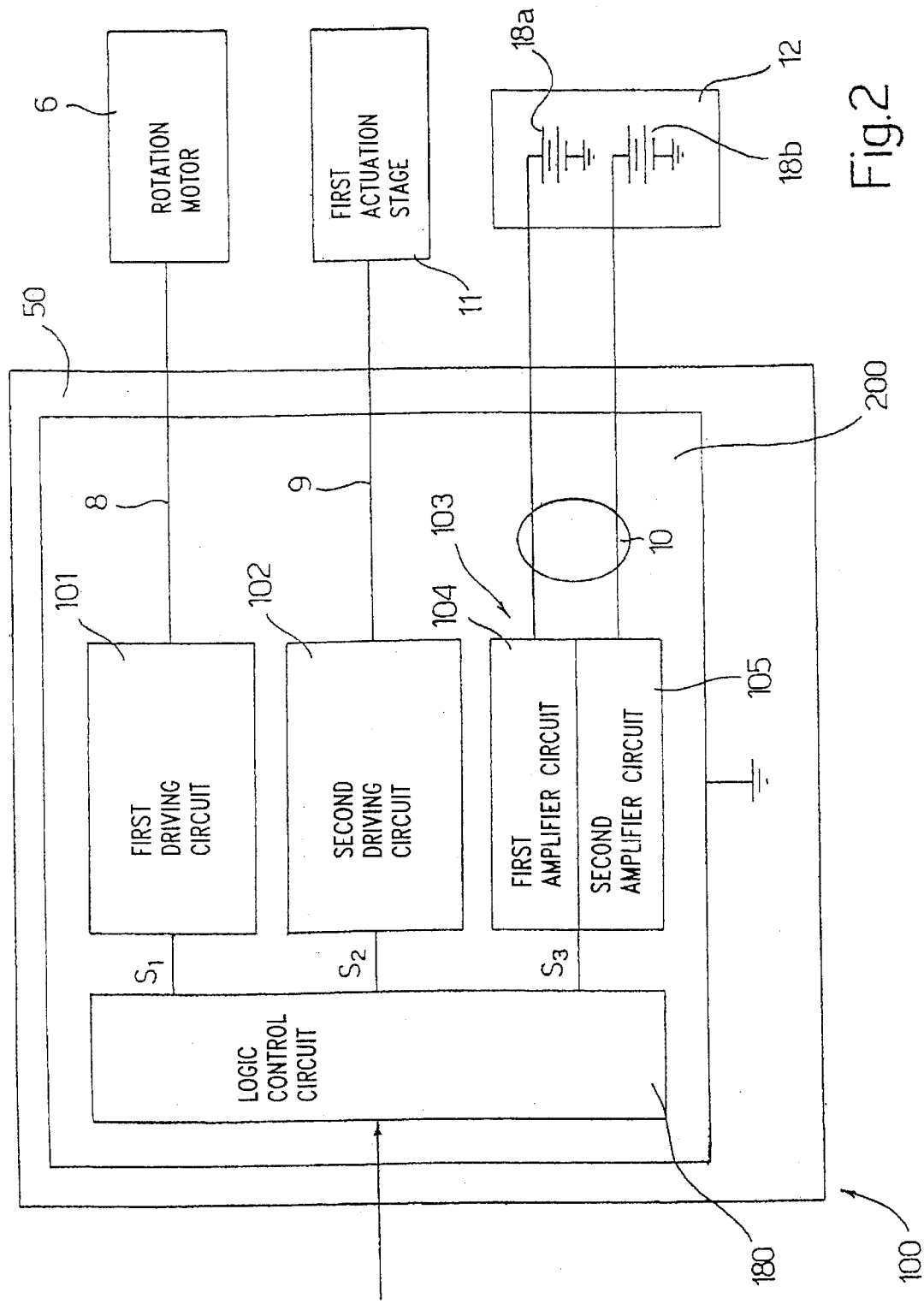
FIG. 2 is a block diagram of an electronic device for driving the hard disk of FIG. 1 according to an embodiment of the invention.

An electronic device 100, illustrated in FIG. 2, is integrated in a single chip 50 of semiconductor material having a substrate 200 defining a reference-potential region GND (ground). The chip 50 comprises a first driving circuit 101 and a second driving circuit 102, of a type in itself known and hence not illustrated in detail in FIG. 2, driving, via the first and the second flexible cables 8 and 9, respectively, the electric motor 6 for turning the hard disk 1, and the first actuation stage 11 of the actuator device 13.

The electronic device 100 further comprises, integrated in the selfsame chip 50, a third driving circuit 103, driving, via the third flexible cable 10, the second actuation stage 12 of the actuator device 13, and a logic control circuit 180 receiving at input 190 an activation signal and generating at output three control signals S1, S2, S3 for the first, second and third driving circuits 101, 102, 103, respectively.

In particular, the third driving circuit 103 comprises a first amplifier circuit 104 for driving the piezoelectric actuator 18a and a second amplifier circuit 105 for driving the piezoelectric actuator 18b.

Since the first and second amplifier circuits 104 and 105 are identical, i.e., they have the same structure and operate in the same way, the amplifier circuit 104 alone will be described in what follows.

Figure 3:
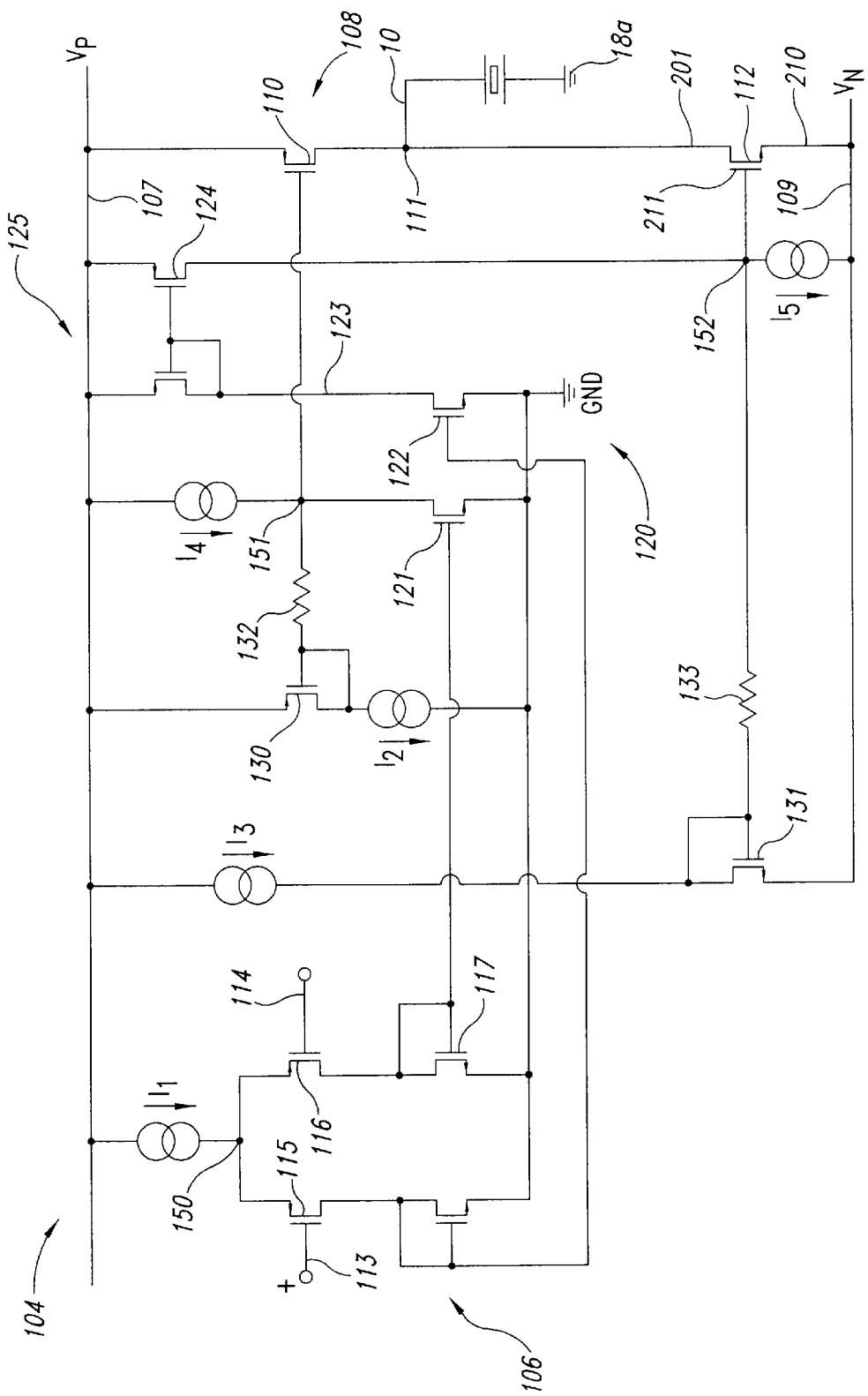
FIG. 3 represents the circuit of one of the blocks of FIG. 2.

With reference to FIG. 3, the amplifier circuit 104 comprises a differential input stage 106 connected between a first supply line 107, which is set at a positive voltage $V_P$, and the reference potential GND, and has a first, non-inverting, input 113, and a second, inverting, input 114, receiving the control signal S3. The differential input stage 106 comprises a first PMOS input transistor 115 and a second PMOS input transistor 116, and a third NMOS input transistor 117 and a fourth NMOS input transistor 118. In detail, the first input transistor 115 has a source terminal connected to a first circuit node 150, a drain terminal connected to the reference potential GND via the fourth input transistor 118, and a gate terminal connected to the non-inverting input of the differential input stage 106. The second input transistor 116 has a source terminal connected to the first circuit node 150, drain terminal connected to the reference potential GND via the third input transistor 117, and gate terminal connected to the inverting input of the differential input stage 106. The third input transistor 117 is diode-connected (i.e., it has its drain terminal and gate terminal short-circuited) and has a drain terminal connected to the drain terminal of the second input transistor 116, and a source terminal connected to the reference potential GND, and a gate terminal. Also the fourth input transistor 118 is diode-connected (i.e., it has drain terminal and gate terminal short-circuited) and has a drain terminal connected to the drain terminal of the first input transistor 115, a source terminal connected to the reference potential GND, and a gate terminal. The differential input stage 106 moreover comprises a first reference current generator I1 connected between the first circuit node 150 and the first supply line 107.

The amplifier circuit 104 further comprises a driving stage 120 cascade-connected to the differential input stage 106 and a final stage 108 cascade-connected to the driving stage 120.

The driving stage 120 comprises a first NMOS transistor 121 and a second NMOS transistor 122. In detail, the first driving transistor 121 has a source terminal connected to the reference potential GND, a drain terminal connected to a second circuit node 151, and a gate terminal connected to the gate terminal of the third input transistor 117. The second driving transistor 122 has a gate terminal connected to the gate terminal of the fourth input transistor 118, a source terminal connected to the reference potential GND, and a drain terminal connected to an input branch 123 of a current-mirror circuit 125 having an output branch 124 connected to a third circuit node 152.

The final stage 108 comprises a first PMOS output transistor 110 having a source terminal connected to the first supply line 107, a drain terminal connected to an output node 111 of the amplifier circuit 104, and a gate terminal connected to the second circuit node 151. The final stage 108 moreover comprises a second, NMOS, output transistor 112 having a drain terminal connected to the output node 111 of the driving circuit 104, a source terminal connected to a second supply line 109, set at a negative potential $V_N$, and a gate terminal connected to the third circuit node 152. The output node 111 of the amplifier circuit 104 is connected to the first piezoelectric actuator 18a via the flexible cable 10.

In addition, the driving circuit 104 comprises a first biasing transistor 130 and a second biasing transistor 131. The first biasing transistor 130 is diode-connected (i.e., it has its drain terminal and source terminal short-circuited) and has a drain terminal connected to the reference potential GND via a second reference current generator I2, gate terminal connected to the second circuit node 151 via a first resistor 132, and a source terminal connected to the first supply line 107.

The second biasing transistor 131 is diode-connected (i.e., it has drain terminal and gate terminal short-circuited) and has a drain terminal connected to the first supply line 107 via a third reference current generator I3, a gate terminal connected to the third circuit node 152 via a second resistor 133, and a source terminal connected to the second supply line 109.

In addition, between the first supply line 107 and the second circuit node 151, a fourth reference current generator I4 is connected, and between the third circuit node 152 and the second supply line 109, a fifth reference current generator I5 is connected.

Operation of the electronic device 100, and in particular of the driving circuit 104, is described below.

In resting conditions, i.e., when the logic control circuit 180 does not generate the control signal S3, the inputs 113 and 114 of the differential input stage 106 are balanced.

Consequently, the current of I4 flows in the first driving transistor 121, and the current of I2 flows in the first biasing transistor 130. Likewise, in the second driving transistor 122 there flows the current of I5 (which is reversed by means of the current mirror 125), and in the second biasing transistor 131 there flows the current of I3. No current flows in the first and second resistors 132, 133, and the voltage drop across them is zero. Consequently, the voltage between the gate terminal and the source terminal of the first biasing transistor 130 is equal to the voltage present between the gate terminal and the source terminal of the first output transistor 110. In these conditions, the current of I2 is repeated in the first output transistor 110 through the current mirror that the latter forms with the first biasing transistor 130. Likewise, the voltage present between the gate terminal and the source terminal of the second biasing transistor 131 is equal to the voltage present between the gate terminal and the source terminal of the output transistor 112. In these conditions, the current of I3 is repeated in the second output transistor 112 via the current mirror that the latter forms with the second biasing transistor 131.

When the logic control circuit 180 generates the control signal S3, the differential input stage 106 unbalances. If, for example, the control signal S3 is such as to cause a decrease in the voltage present on the inverting input 114 and an increase in the voltage present on the non-inverting input 113, the current flowing in the second and third input transistors 116, 117 increases, and the current flowing in the first and fourth input transistors 115, 118 decreases. These currents are repeated, respectively, in the first driving transistor 121 and in the second driving transistor 122. The first driving transistor 121 thus carries a current greater than the current of I4, whilst the second driving transistor 122 carries a current smaller than the current of I5. This results in a decrease in the voltage on the second and third circuit nodes 151 and 152, and in a non-zero voltage drop across the first and second resistors 132 and 133. In these conditions, the voltage present between the gate terminal and the source terminal of the first output transistor 110 is higher than the voltage present between the gate terminal and the source terminal of the first biasing transistor 130. Consequently, in the output transistor 110 there flows a current greater than the current of I2. The first output transistor 110 thus tends to close, connecting the output node 111 to the supply line 107. In addition, the voltage present between the gate terminal and the source terminal of the second output transistor 112 is lower than the voltage present between the gate terminal and the source terminal of the second biasing transistor 131. Consequently, in the output transistor 112 there flows a current smaller than the current of I3, and the second output transistor 112 tends to open, isolating the output node 111 from the second supply line 109. Vice versa, when the control signal S3 is such as to increase the voltage present on the inverting input 114 and to decrease the voltage present on the non-inverting input 113, the current flowing in the second and third input transistors 116, 117 decreases, and the current flowing in the first and fourth input transistors 115, 118 increases. These currents are repeated, respectively, in the first driving transistor 121 and in the second driving transistor 122. The first driving transistor 121 thus carries a current smaller than the current I4, whilst the second driving transistor 122 carries a current greater than the current of I5. This results in a voltage increase on the second and third circuit nodes 151 and 152, and in a non-zero voltage drop, of opposite sign, across the first and second resistors 132 and 133. In these conditions, in the first output transistor 110 there flows a current smaller than the current of I2, and the first output transistor 110 tends to open, isolating the output node 111 from the supply line 107. In the second output transistor 112 there flows instead a current greater than the current I3, and the second output transistor 112 tends to open, connecting the output node 111 to the second supply line 109.

In order to integrate the amplifier circuit 104 in the chip 50, the second output transistor 112, the second driving transistor 131, the second resistor 133, and the fifth reference current generator I5, i.e., all the components of the amplifier circuit 104 that are set at a negative potential $V_N$, are made in a double-insulation integrated structure referred to as "collection-free" structure. The presence of this double insulation enables the substrate 200 to be biased to ground without any of the junctions that make up the above-mentioned components being forward-biased.

Figure 4:
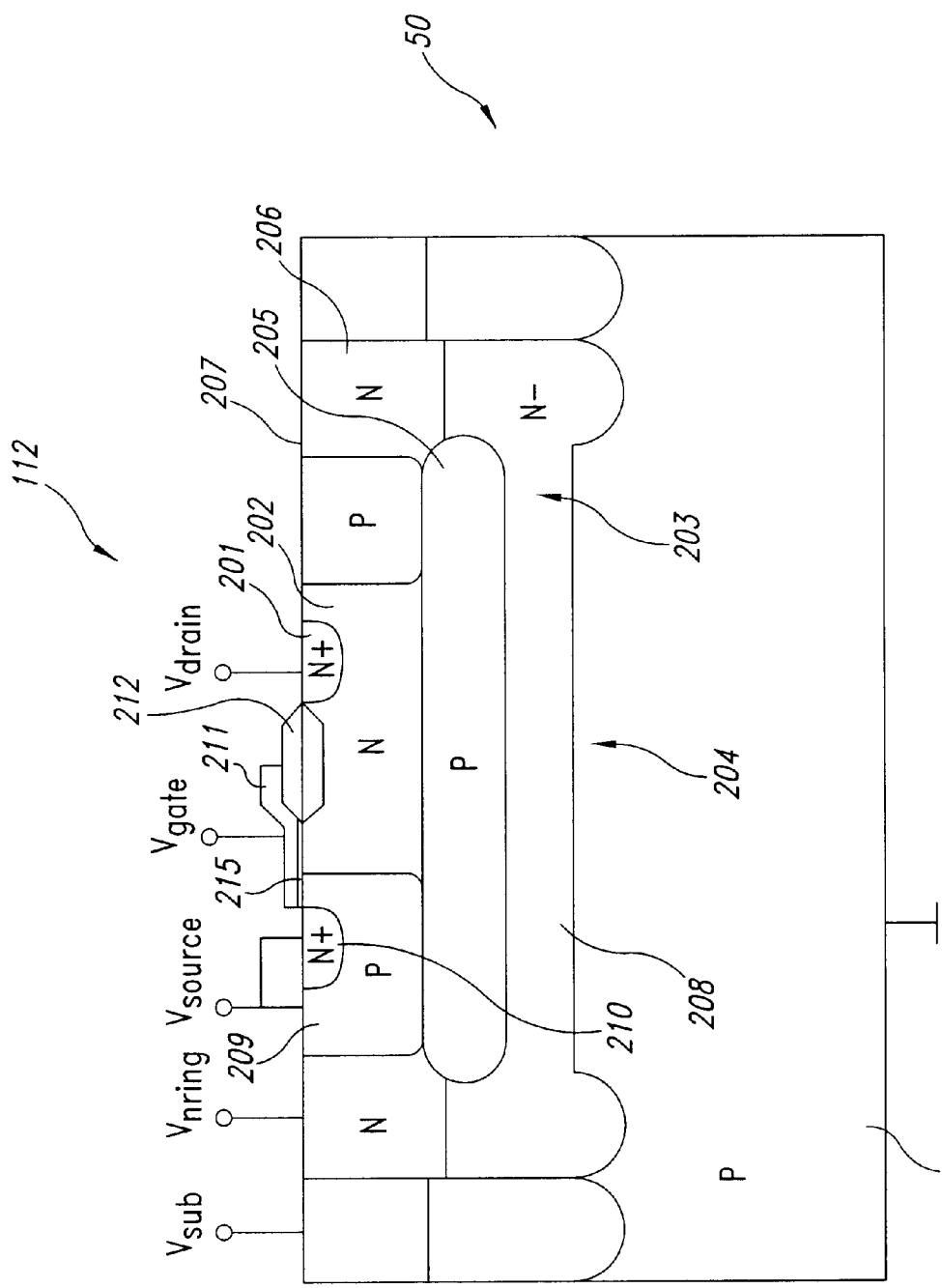
FIG. 4 is a cross section through a chip incorporating a portion of the electronic device of FIG. 2.

In particular, FIG. 4 shows a cross section of the chip 50 incorporating the second output transistor 112. In detail, the second output transistor 112 has a drain region 201 having an $N^+$-type conductivity, which is made in a first well 202 having an N-type conductivity. The first well 202 is enclosed in a second well 203 having a P-type conductivity, which is in turn enclosed in a third well 204 having an N-type conductivity. The second well 203 comprises a first buried region 205, which is set at a negative potential $V_N$ and is formed beneath the first well 202. The second well 203 further comprises a first deep region 206, having an elongated annular shape, only two portions of which may be seen in FIG. 4. The first deep region 206 extends as far as the first buried region 205 so as to connect it to a surface 207 of the chip 50 and to isolate the first well 202 completely from the substrate 200.

Likewise, the third well 204 comprises a second buried region 208 having an $N^-$-type conductivity formed beneath the second well 203, and a second deep region 209 having an elongated annular shape, only two portions of which may be seen in FIG. 4. The second deep region 209 extends as far as the second buried region 208 so as to connect it to the surface 207 of the chip 50 and to isolate the second well 203 completely from the substrate 200. In particular, the third well 204 is set at a potential higher than or equal to the reference potential GND.

Again with reference to FIG. 4, the second deep region 209 houses a source region 210 of the second output transistor 112 having an N+-type conductivity. The latter transistor moreover comprises a gate region 211 which extends above the first well 204 and the second deep region 209. A thick oxide portion 212 and a thin oxide portion 215 isolate the gate region 211 from the first well 204.

What has been described previously can be equally applied to the amplifier circuit 105 driving the piezoelectric actuator 18b. In particular, the components of the amplifier circuit 105 set at a negative potential $V_N$ are made in a double-isolation integrated structure equivalent to the one illustrated previously.

The advantages that may be achieved with the electronic device illustrated are described below. In the first place, it is possible to integrate the electronic device 100 in a single chip 50, instead of in two distinct chips as in the known device. Consequently, the electronic device 100 has reduced dimensions, shorter assembly times and contained costs. In particular, the costs involved in the testing phase are considerably reduced, in that testing is carried out on a single chip, and not on two distinct chips. It is moreover possible to verify the efficiency of the electronic device 100 as a whole.

The electronic device 100 moreover enables saving of silicon area. In fact, many circuits that implement general functions, such as voltage-regulating circuits, biasing circuits, and circuits for protection against electrostatic discharges (ESDs), can be integrated within the single chip 50, in that they do not have to be shared any longer between two distinct chips. All this also enables saving of the area in the printed circuit on which the electronic device 100 is soldered.

As compared to the known device, the electronic device 100 moreover presents greater reliability and immunity from external disturbance, in that the interconnections between the device itself and the amplifier circuits 104 and 105 are provided inside the chip 50, and not on the printed circuit; greater speed, in that the said interconnections have fewer parasitic components, and hence higher driving frequencies may be used; and a lower consumption, in that, as has already been mentioned previously, certain circuit blocks are shared, and hence it is not necessary to duplicate them.

Finally, it is clear that numerous modifications and variations may be made to the electronic device described herein, all falling within the scope of the inventive idea, as defined in the attached claims.

For example, all the components of the amplifier circuits 104 and 105 to which the negative potential $V_N$ is applied can be integrated using structures that are equivalent to the one that has been described previously, such as triple-well structures, or using SOI wafers.

What is claimed is:

1. An electronic device for driving an actuator device for a hard disk and a motor for turning the hard disk, said actuator device supporting a read/write transducer and including a first actuation stage and a second actuation stage which respectively control a first displacement and second displacement of said read/write transducer, said electronic device comprising:
    a first driving circuit connected to said rotation motor and integrated in a chip of semiconductor material that has a substrate defining a reference-potential region;
    a second driving circuit integrated in said chip and connected to the first actuation stage; and
    a third driving circuit integrated in a double-insulation structure in said chip to be electrically isolated from the substrate, the third driving circuit connected to the second actuation stage of the actuator device.

2. The device of claim 1, wherein said third driving circuit comprises two amplifier circuits integrated in said chip and each connected to a respective piezoelectric actuator, each of said amplifier circuits driving a respective piezoelectric actuator to control the second displacement of the read/write transducer.

3. The device of claim 2, wherein each of said amplifier circuits is connected between a first supply line and a second supply line that are respectively set at a positive potential and at a negative potential with respect to said substrate, and each of said amplifier circuits has:
    an input receiving a control signal generated by a logic control circuit belonging to said electronic device; and
    an output connected to said respective piezoelectric actuator, said output selectively connecting said respective piezoelectric actuator to said first and second supply lines according to said control signal.

4. The device of claim 3 wherein said amplifier circuits each comprise:
    an input stage receiving said control signal;
    a driving stage cascade-connected to said input stage; and
    a final stage cascade-connected to said driving stage and comprising first and second output elements, said first output element connected between said first supply line and said output of said respective amplifier circuit, and said second output element being connected between said output of said respective amplifier circuit and said second supply line.

5. The device of claim 4, wherein said first output element has a control terminal of its own connected to a first biasing element that is connected between said first supply line and said substrate, and said second output element has a control terminal of its own connected to a second biasing element that is connected between said first supply line and said second supply line.

6. The device of claim 3 wherein said second supply line is connected to a respective circuit portion of said amplifier circuits, each said circuit portion being made in a double-insulation structure formed in said chip.

7. The device of claim 6, wherein said double-insulation structure comprises:
    a first isolation region having a first type of conductivity formed in said substrate, said substrate having a second type of conductivity;
    a second isolation region having said second type of conductivity and enclosing at a bottom and sides said first isolation region; and
    an isolated region having said first type of conductivity and being enclosed at a bottom and sides by said second isolation region, said isolated region surrounding said circuit portion.

8. The device of claim 7, wherein said first isolation region is biased at a potential not lower than that of said substrate, and said second isolation region is biased at said negative potential.

9. The device of claim 7, wherein said first conductivity is of the N-type and said second conductivity is of the P-type.

10. A hard disk system, comprising
    a hard disk and a motor configured for turning the hard disk;
    a read/write transducer associated with the hard disk and configured for displacement along a first axis; and
    an actuator device coupled to the motor and to the read/write transducer, the actuator device comprising:
        a first driving circuit connected to the motor and configured to control rotation of the motor, the first driving circuit integrated in a chip of semiconductor material having a substrate defining a reference-potential region;
        a second driving circuit integrated in the chip of semiconductor material and connected to a first actuation stage that is configured to perform a rough displacement of the read/write transducer; and
        a third driving circuit integrated in a double insulation structure in the chip of semiconductor material to be electrically isolated from a substrate of the chip, the third driving circuit connected to a second actuation stage that is configured to perform a finer displacement of the read/write transducer.

11. The system of claim 10, comprising first and second piezoelectric actuators coupled to the read/write transducer, a third driving circuit comprising first and second amplifier circuits integrated in the chip of semiconductor material, each of the first and second amplifier circuits connected to the respective first and second piezoelectric actuators and configured to drive the respective piezoelectric actuator to control the finer displacement of the read/write transducer.

12. The system claim 11, comprising a logic control circuit configured to generate a control signal to the first and second amplifier circuits.

13. The system of claim 12, wherein each of the first and second amplifier circuits is connected between a first supply line and a second supply line that are respectively set at a positive potential and a negative potential with respect to the substrate, each of the first and second amplifier circuits comprising:

an input configured to receive a control signal generated by the logic control circuit; and an output connected to the respective piezoelectric actuator, the amplifier circuit configured to selectively connect the respective piezoelectric actuator to the first and second supply lines in response to the control signal.

14. The system of claim 12, wherein each of the first and second amplifier circuits comprise:

an input stage configured to receive a control signal generated by the logic control circuit;

a driving stage cascade-connected to the input stage; and a final stage cascade-connected to the driving stage and comprising first and second output elements, the first output element connected between a first supply line and the output of the respective amplifier circuit, and the second output element connected between the output of the respective amplifier circuit and a second supply line.

15. The system of claim 14, wherein the first output element has a control terminal of its own connected to a first biasing element that is connected between the first supply line and the substrate, and a second output element having a control terminal of its own connected to a second biasing element that is connected between the first supply line and the second line.

16. The system of claim 14, wherein the second supply line is connected to a respective circuit portion of the amplifier circuit, each said circuit portion formed in a double-insulation structure in the chip of semiconductor material.

17. The system of claim 16, wherein the double-insulation structure comprises a first isolation region having a first conductivity type formed in the substrate of a second conductivity type, a second isolation region of second conductivity type structured to enclose a bottom and side of the first isolation region, and an isolated region of first conductivity type and configured to be enclosed at a bottom and sides thereof by the second isolation region, the isolated region configured to surround the respective circuit portion of the amplifier circuit.

18. The system of claim 17, wherein the first isolation region is biased at a potential not lower than that of the substrate, and the second isolation region is biased at a negative potential.

* * * * *

UNITED STATES PATENT AND TRADEMARK OFFICE
CERTIFICATE OF CORRECTION

PATENT NO. : 6,721,127 B2
DATED : April 13, 2004
INVENTOR(S) : Giulio Ricotti et al.

It is certified that error appears in the above-identified patent and that said Letters Patent is hereby corrected as shown below:

Column 10,
Line 7, "second line." should read as -- second supply line. --.

Signed and Sealed this

Twentieth Day of July, 2004

JON W. DUDAS
*Acting Director of the United States Patent and Trademark Office*